United States Patent [19]

Sarraf et al.

[11] Patent Number: 5,708,081
[45] Date of Patent: Jan. 13, 1998

[54] COMPOSITION COMPRISING A VINYLAROMATIC POLYMER AND A RUBBER AND PROCESS FOR OBTAINING IT

[75] Inventors: Tarek Sarraf, Lons, France; Thomas Edward Jenkins, Marple, United Kingdom

[73] Assignee: Elf Atochem S. A., Puteaux, France

[21] Appl. No.: 481,251

[22] PCT Filed: Nov. 22, 1994

[86] PCT No.: PCT/FR94/01360

§ 371 Date: Jun. 12, 1995

§ 102(e) Date: Jun. 12, 1995

[87] PCT Pub. No.: WO95/15348

PCT Pub. Date: Jun. 8, 1995

[30] Foreign Application Priority Data

Nov. 30, 1993 [FR] France ................... 93 14337

[51] Int. Cl.⁶ ................. C08L 25/04; C08L 55/02; C08L 9/00

[52] U.S. Cl. ........................... 525/87; 525/316

[58] Field of Search ............... 525/87, 316, 89, 525/98, 99

[56] References Cited

FOREIGN PATENT DOCUMENTS

| 0 081 015 A1 | 6/1983 | European Pat. Off. . |
| 2-238011 | 9/1990 | Japan . |
| 1143157 | 2/1969 | United Kingdom . |

OTHER PUBLICATIONS

English translation of JP4100810, Apr. 2, 1992.
Japan Synthetic Rubber, WPI AN 90-331461 (1990).

*Primary Examiner*—Mark L. Warzel
*Attorney, Agent, or Firm*—Pennie & Edmonds

[57] ABSTRACT

The invention relates to polymer compositions of high impact strength, comprising a vinylaromatic polymer and a rubber, and to a process for their manufacture.

These compositions are obtained by virtue of the use of two polybutadienes whose viscosities, measured at 25° C. at a concentration of 5% in styrene, are, respectively, between 120 and 350 centipoises in the case of one and between 30 and 90 centipoises in the case of the other.

27 Claims, No Drawings

5,708,081

COMPOSITION COMPRISING A VINYLAROMATIC POLYMER AND A RUBBER AND PROCESS FOR OBTAINING IT

TECHNICAL FIELD

The invention relates to polymer compositions comprising a vinylaromatic polymer and a rubber. These compositions are easy to process and exhibit good gloss and excellent mechanical properties.

They find applications in fields as diverse as electrical household appliances, that of office equipment or packaging.

PRIOR ART

Various techniques for improving the impact strength of compositions based on vinylaromatic polymer and rubber have been proposed.

Document EP 418,042 teaches an impact polystyrene composition comprising a branched polybutadiene exhibiting a double distribution of molecular masses, the ratio of the mean molecular masses of the component of high masses to that of low masses being higher than a factor of 2.5 and preferably between 3 and 5. The component of high molecular masses corresponds to branched molecules, while the component of low molecular masses corresponds to incompletely branched molecules. The polybutadiene has a cis-1,4 structure content which is preferably lower than 70% and more preferably lower than 50%.

The impact polystyrenes thus obtained have a marked bimodal structure and the distribution of their particle diameters indicates the presence of three distinct particle populations.

Document JP 4-100810 teaches the use of a mixture of two polybutadienes exhibiting very different viscosities. One of these polybutadienes must exhibit an intrinsic viscosity of between 3 and 7 dl/g, whereas the other polybutadiene must exhibit an intrinsic viscosity of between 0.5 and 1.4 dl/g. The use of such polybutadienes exhibits limits. In fact, the manufacture of a polybutadiene whose intrinsic viscosity is close to 7 dl/g is difficult to carry out. In addition, if the viscosity of the second polybutadiene is close to 1.4 dl/g, the viscosity of the polymer solution, which also contains the first polybutadiene of particularly high viscosity, becomes too high.

DESCRIPTION OF THE INVENTION

Polymer compositions comprising a vinylaromatic polymer and a rubber have now been found, the said rubber being derived from a high-viscosity polybutadiene and from a low-viscosity polybutadiene, the intrinsic viscosities of these two polybutadienes being close but different and such that that of the high-viscosity polybutadiene is lower than 3 dl/g and that of the low-viscosity polybutadiene is higher than 1.4 dl/g. The term rubber denotes the elastomeric phase present in the composition according to the invention.

This elastomeric phase contains all the mass of the polybutadienes initially introduced. The rubber of the compositions according to the invention therefore contains polybutadiene which my be partially crosslinked or grafted onto the vinylaromatic polymer. This rubber forms the shell of particles containing a proportion of the vinylaromatic polymer, the said particles themselves being dispersed in a matrix of vinylaromatic polymer.

The use of the two polybutadienes, of high and low viscosity, produces polymer compositions with remarkable mechanical properties, in particular with regard to the impact strength. These properties are generally superior to those obtained by employing only one of these polybutadienes, with an appreciably identical polybutadiene content and with an appreciably identical degree of grafting of the polybutadiene with the vinylaromatic polymer in the polymer compositions being considered.

Furthermore, a polymer composition according to the invention exhibits an impact strength which is higher than the arithmetic mean of the impact strengths of the compositions obtained, on the one hand, with the high-viscosity polybutadiene by itself and, on the other hand, with the low-viscosity polybutadiene by itself, this being at a polybutadiene content which is appreciably identical and with an appreciably identical degree of grafting of polybutadiene with vinylaromatic polymer in the polymer compositions being considered.

This is reflected in the fact that if

P denotes the impact strength of a composition C according to the invention, in which the rubber is derived from a high-viscosity polybutadiene X and from a low-viscosity polybutadiene Y, x denoting the percentage by weight of X relative to the total weight of polybutadiene introduced and y denoting the percentage by weight of Y relative to the total weight of polybutadiene introduced, $P_x$ denotes the impact strength of a composition Cx comprising the same vinylaromatic polymer as C and a rubber obtained exclusively from X, the polybutadiene content in Cx being here identical with the polybutadiene content in C, the degrees of grafting of the polybutadienes in C and Cx being appreciably identical, $P_y$ denotes the impact strength of a composition Cy comprising the same vinylaromatic polymer as C and a rubber obtained exclusively from Y, the polybutadiene content in Cy being here identical with the polybutadiene content in C, the degree of grafting of the polybutadienes in C and Cy being appreciably identical, there is a relationship P>

$$\frac{xP_x + yP_y}{x+y}$$

In addition, a composition according to the invention generally exhibits mechanical properties which are superior to those obtained by the use of a single polybutadiene whose viscosity is comparable with the viscosity of a mixture of the polybutadienes employed for producing the said composition, the said mixture containing the high- and low-viscosity polybutadienes in proportions which are identical with those employed for the production of the composition according to the invention, the degrees of grafting of the polybutadienes in the polymer compositions being considered being appreciably identical.

This last comparison with a single polybutadiene is meaningful only if the latter itself is not a mixture of different polybutadienes and, in any event, exhibits a polydispersity, that is to say a ratio of its mass-average molecular mass to its number-average molecular mass, lower than 4.

The high-viscosity polybutadiene is of linear structure, has a cis-1,4 structure content higher than 80% and preferably higher than 90% and exhibits a viscosity, measured at 25° C. at a concentration of 5% by weight in styrene, ranging from 120 to 350 centipoises and preferably from 180 to 300 centipoises. The low-viscosity polybutadiene is of linear, branched or star-shaped structure, has a cis-1,4 structure content lower than 80% and preferably between 30 and 60% and exhibits a viscosity, measured at 25° C. at a concentration of 5% by weight in styrene, ranging from 30 to 90 centipoises and preferably from 40 to 75 centipoises.

The high-viscosity polybutadiene preferably exhibits a 1,2-vinyl structure content ranging from 0.1 to 5% and more preferably from 0.5 to 3%.

The low-viscosity polybutadiene preferably exhibits a 1,2-vinyl structure content ranging from 1 to 25% and more preferably from 5 to 18%.

The use of the polybutadienes described above is preferably carried out so that the high-viscosity polybutadiene represents 10 to 90% by weight of the total polybutadiene introduced and in that the low-viscosity polybutadiene represents 90 to 10% by weight of the total polybutadiene introduced.

Preferably, also, the use of the polybutadienes described above is carried out so that the high-viscosity polybutadiene represents 10 to 70% by weight of the total polybutadiene introduced and in that the low-viscosity polybutadiene represents 90 to 30% by weight of the total butadiene introduced.

The compositions according to the invention preferably contain polybutadiene in a proportion of 2 to 25%. This includes all the polybutadiene present in the compositions, either in a partially crosslinked form or in a form grafted onto the vinylaromatic polymer, the grafted vinylaromatic polymer itself not being included in the percentage of polybutadiene shown above.

The vinylaromatic polymer is obtained by the polymerization of at least one vinylaromatic monomer described below. It may therefore be a copolymer.

It is not ruled out that the polymer composition may contain the adjuvants which are usual in vinylaromatic polymers, such as at least one antioxidant and/or at least one plasticizer.

Another subject of the invention relates to a process for the manufacture of the polymer compositions described above.

The process according to the invention, which can function continuously or noncontinuously, comprises a stage of polymerization of at least one vinylaromatic monomer in the presence of high- and low-viscosity polybutadienes described above.

This polymerization stage maybe a suspension or bulk polymerization process, the principle of these two techniques being well known to a person skilled in the art. In the case or the polymerization must take place in bulk the polybutadienes are first of all dissolved in at least one vinylaromatic monomer, optionally in the presence of an organic solvent, and a polymerization is then carried out, the initiation of which may be thermal or using peroxide. If its initiation is thermal, this polymerization may be conducted between 110° and 180° C. and preferably between 120° and 160° C. If the initiation of the polymerization uses peroxide, the polymerization will be generally conducted between 70° and 180° C. and preferably between 90° and 160° C. During this polymerization stage the vinylaromatic monomer is polymerized either by itself or with a proportion of the polybutadienes and in this latter case grafting is said to take place between the polybutadienes and the vinylaromatic monomer and, in addition, the polybutadienes are partially crosslinked.

During these reactions the well-known phenomenon of phase inversion takes place, resulting in the formation of particles dispersed in vinylaromatic polymer.

The stirring must be sufficient for this dispersion of particles to be uniform.

Following the polymerization stage it is appropriate to proceed to the removal of the volatile species such as unreacted monomers and possibly solvent. This may be carried out using conventional techniques such as by the use of a devolatilizer operating with heating and under vacuum.

The final polybutadiene and vinylaromatic polymer content of the composition according to the invention depends on the degree of progress of the polymerization carried out before removal of the volatile species. In fact, if the degree of progress of polymerization is low, the removal of the volatile species will result in the removal of a large quantity of vinylaromatic monomer and the final polybutadiene content of the composition will be higher. In order not to produce an excessively high crosslinking of the polybutadienes it is preferable not to force the polymerization of the vinylaromatic monomers to 100%.

The progress of the polymerization can be followed by virtue of samples taken during the polymerization stage and by determining the solids content on the samples withdrawn. The solids content means the percentage by weight of solid obtained after evaporation of the withdrawn samples in a vacuum of 25 mbar for approximately 20 minutes at 200° C., in relation to the initial weight of the sample. This treatment removes from the withdrawn sample the vinylaromatic monomers unpolymerized at the time of the withdrawal. The polymerization can be taken further, for example until a solids content of 70 or 80% is obtained.

At least one adjuvant or polymerization initiator, these being conventional in this kind of preparation, may be added to the polymerization mixture before or during the polymerization. These adjuvants may be plasticizers such as mineral oils, butyl stearate or dioctyl phthalate, stabilizers such as antioxidants, which may be phenol substituted by an alkyl group, such as di-tert-butyl-para-cresol, or phosphites such as trinonyl phenylphosphite.

A plasticizing oil may be introduced, generally in a proportion such that it is present in the final composition in a ratio of 0 to 8% by weight and preferably in a ratio of 0 to 5% by weight.

The polymerization initiators which are optionally added are those usually employed for this kind of preparation. They may be chosen from peroxides such as dibenzoyl peroxide, tert-butyl peroxybenzoate and 1,1-bis(tert-butylperoxy)cyclohexane Vinylaromatic monomer is intended to mean styrene, styrene substituted by an alkyl group on the vinyl group, such as alpha-methylstyrene or alpha-ethylstyrene, styrene substituted by an alkyl group on the ring, such as ortho-vinyltoluene, para-vinyltoluene, ortho-ethylstyrene or 2,4-dimethylstyrene, styrene substituted by a halogen on the ring, such as, for example, 2,4-dichlorostyrene, and styrene substituted both by a halogen and an alkyl group, such as 2-chloro-4-methylstyrene, as well as vinylanthracene. Styrene is a preferred vinylaromatic monomer.

The polymerization may be conducted in the presence of an organic solvent. This solvent will be chosen so that it does not boil under polymerization conditions and so that it is miscible with the vinylaromatic monomer and the vinylaromatic polymer derived therefrom. It is possible to employ alicyclic hydrocarbons such as cyclohexane or, preferably, aromatics such as toluene, benzene, ethylbenzene or xylene.

In general, the quantity of solvent which is employed will be such that the polymerization mixture does not contain more than 40% by weight of organic solvent.

EMBODIMENTS OF THE INVENTION

In the examples which follow, the structure and the properties of the polymer compositions obtained have been determined by the following techniques:

melt flow index: ISO standard 1133 condition H 1-kg Vicat point: ISO standard 306 A notched Izod impact strength: ISO standard 180/1A elasticity modulus measured in flexure: ISO standard 178 tensile and flexural strength: ISO standard R527 molecular mass of the polystyrene: the polystyrene is extracted from the impact polystyrene using methyl ethyl ketone and its molecular mass is measured by gel permeation chromatography (GPC).

In Table 1 Mw denotes the weight-average molecular mass of the polystyrene, Mn denotes the number-average molecular mass of the polystyrene and Mw/Mn denotes the ratio of the weight-average molecular mass to the number-average molecular mass of the polystyrene.

swelling ratio and residue content 0.4 grams of impact polystyrene are placed in 40 ml of toluene at ambient temperature with stirring for two hours. The composition thus obtained is then centrifuged at 20,000 revolutions per minute for 30 minutes so as to make it possible to separate off the gel formed from the solution. The wet (toluene-impregnated) gel obtained after separation from the solution is then dried in vacuum at 80° C. and a dry gel is obtained.

If Mh denotes the mass of wet gel, Md the mass of dry gel and Mt the mass of the impact polystyrene test sample, the swelling index SI is given by the formula SI=Mh/Md and the residue content Cr, expressed as percentage by weight, is given by the formula Cr=Md/Mt×100.

The residue content indicates approximately the rubber content of the polymer composition since it adds the total percentage by weight of polybutadiene and the percentage by weight of polystyrene grafted to polybutadiene in the polymer composition.

Two compositions exhibiting an identical residue content and an identical polybutadiene content will therefore be considered as exhibiting an identical degree of grafting between the polybutadiene and the polystyrene.

polybutadiene content in the compositions: NF standard T 51-007 mean size of the rubber particles: by sedimentation particle size determination (capa 700) after dissolving in methyl ethyl ketone.

In the tables, the line "HV/LV" gives the relative percentage by weight of high-viscosity polybutadiene ("HV") and of low-viscosity polybutadiene ("LV").

EXAMPLE 1

Into a 15-litre reactor fitted with a mechanical stirrer and a temperature control are introduced 7.9 kg of styrene, 1.2 kg of ethylbenzene and 300 grams of a plasticizing oil with a viscosity of 210 centipoises at 20° C., of Primol 352 trademark, marketed by Esso.

300 grams of a first polybutadiene of trademark BR 1202 G, marketed by Shell, are then introduced at ambient temperature and with stirring in the form of gummy solid pieces, the said polybutadiene being of linear structure and exhibiting a viscosity of 160 centipoises at 25° C. at a concentration of 5% in styrene and an intrinsic viscosity of 2.5 dl/g at 25° C., a weight-average molecular mass of 287 000, a cis-1,4 structure content of 96.5, followed by 300 grams of a second polybutadiene of trademark P 1001, marketed by Enichem, in the form of gummy solid pieces, the said polybutadiene being of branched structure and exhibiting a viscosity of 45 centipoises at 25° C. at a concentration of 5% in styrene and an intrinsic viscosity of 1.9 dl/g at 25° C., a weight-average molecular mass of 175 000, a cis-1,4 structure content of 45% and a 1,2-vinyl structure content of 11%.

The two polybutadienes were therefore introduced into the reactor in equal quantity. By way of guidance it is mentioned that an equal parts mixture of these two polybutadienes exhibits a viscosity of 120 centipoises at 25° C. at a concentration of 5% in styrene.

After the polybutadiene has dissolved completely, thermal polymerization of the solution is started. The progress of the polymerization is followed by measuring the solids content obtained from withdrawals taken during the polymerization. The solids content corresponds to the percentage by weight of solid obtained after vacuum evaporation at 200° C. of the samples withdrawn, relative to the initial weight of the sample.

The reactor is first of all heated to 126° C. until a solids content of 27% is obtained. The temperature is then raised from 126° to 157° C. over 90 minutes. The solids content at this time is approximately 70%. The content of the reactor is then transferred to a devolatilizer at approximately 180° C. under vacuum, for approximately 10 minutes so as to extract the unpolymerized styrene and the ethylbenzene. The product obtained is granulated in a manner which is known to a Person skilled in the art. Specimens are produced by injection moulding for carrying out the mechanical tests. The results are collated in Table 1. The impact polystyrene obtained exhibits a monomodal particle size distribution with a maximum at about 1 μm.

EXAMPLE 2

Example 1 is repeated, except that 150 grams of the first polybutadiene and 450 grams of the second polybutadiene are introduced. The results are collated in Table 1.

EXAMPLE 3 (Comparative)

Example 1 is repeated, except that the 300 grams of the first polybutadiene and the 300 grams of the second polybutadiene are replaced with 600 grams of a linear polybutadiene of trademark HX 529C, marketed by Bayer, with a viscosity of 140 centipoises at 25° C. at a concentration of 5% in styrene and intrinsic viscosity of 2.1 dl/g at 25° C., with a weight-average molecular mass of 224 000, polydispersity of 1.26, cis-1,4 structure content of 38% and 1,2-vinyl structure content of 11%. The results are collated in Table 1.

EXAMPLE 4

Into a 15-litre reactor fitted with a mechanical stirrer and a temperature control are introduced 9 kg of styrene, 0.6 kg of ethylbenzene, 0.2 kg of a plasticizing oil with a viscosity of 210 centipoises at 20° C., of Primol 352 trademark, marketed by Esso.

200 grams of a first polybutadiene of trademark BR 1202G, marketed by Shell, are then introduced at ambient temperature and with stirring in the form of gummy solid pieces, the said polybutadiene being of linear structure and exhibiting a viscosity of 160 centipoises at 25° C. at a concentration of 5% in styrene and an intrinsic viscosity of 2.5 dl/g at 25° C., a weight-average molecular mass of 287 000, a cis-1,4 structure content of 96.5%, followed by 200 grams of a second polybutadiene of trademark HX 565SIC, marketed by Bayer, in the form of gummy solid pieces, said polybutadiene being of branched structure and exhibiting a viscosity of 40 centipoises at 25° C. at a concentration of 5% in styrene and an intrinsic viscosity of 1.7 dl/g at 25° C., a weight-average molecular mass of 165 000, a cis-1,4 structure content of 37% and a 1,2-vinyl structure content of 11%.

After the polybutadiene has dissolved completely, thermal polymerization of the solution is started in a way identical with the polymerization procedure described in Example 1. The results are collated in Table 1.

EXAMPLE 5 (comparative)

The procedure is as in Example 4, except that the 200 grams of the second polybutadiene are replaced with 200 grams of a linear polybutadiene of trademark H 529C marketed by Bayer, exhibiting a viscosity of 120 centipoises at 25° C. at a concentration of 5% in styrene and an intrinsic viscosity of 2.1 dl/g at 25° C., a weight-average molecular mass of 224 000, a cis-1,4 structure content of 38% and a 1,2-vinyl structure content of 11%. The results are collated in Table 1.

EXAMPLE 6 (comparative)

The procedure is as in Example 1, except that 600 grams of the first polybutadiene are introduced and no second polybutadiene.

The results are collated in Table 2.

EXAMPLE 7 (comparative)

The procedure is as in Example 1, except that 600 grams of the second polybutadiene are introduced and no first polybutadiene.

The results are collated in Table 2.

EXAMPLE 8

The procedure is as in Example 1, except that 60 grams of the first polybutadiene and 540 grams of the second polybutadiene are introduced.

The results are collated in Table 2.

EXAMPLE 9

The procedure is as in Example 1, except that 420 grams of the first polybutadiene and 180 grams of the second polybutadiene are introduced.

The results are collated in Table 2.

EXAMPLE 10

The procedure is as in Example 4, except that the 200 grams of polybutadiene of trademark BR 1202 G are replaced with 200 grams of a polybutadiene of trademark BR 40 marketed by Enichem, the latter polybutadiene having a cis-1,4 structure content higher than 98% and a viscosity of 330 centipoises at 25° C. at a concentration of 5% in styrene.

The results are collated in Table 2.

TABLE 1

| | | UNIT | EXAMPLE 1 | EXAMPLE 2 | EXAMPLE 3 (comparative) | EXAMPLE 4 | EXAMPLE 5 (comparative) |
|---|---|---|---|---|---|---|---|
| Structure of the polymer compositions | Polybutadiene content | weight % | 8.2 | 8.5 | 8.4 | 6.3 | 6.1 |
| | HV/LV | weight % | 50/50 | 25/75 | | | |
| | mean particle size | µm | 1.2 | 1.1 | 1.6 | | |
| | Mw | g/mol | 195 900 | 199 100 | 195 200 | 217 000 | 214 000 |
| | Mn | g/mol | 78 380 | 79 850 | 77 810 | 70 000 | 69 700 |
| | Mw/Mn | | 2.5 | 2.5 | 2.5 | 3.1 | 3.1 |
| | Residue content | % by weight | 22.3 | 22.1 | 25.2 | 16.5 | 18.5 |
| | Swelling index | | 14.6 | 12.6 | 14.9 | 10.6 | 10.2 |
| Mechanical properties | Melt index | g/10 min | 4 | 3.7 | 3.3 | 3.5 | 3.3 |
| | 1 kg Vicat point | °C. | 96.3 | 96.5 | 97 | | |
| | notched Izod impact strength | kg cm/cm$^2$ | 11.5 | 12.2 | 10.2 | 7.6 | 6.7 |
| | Flexural modulus | MPa | 1860 | 1990 | 1620 | | |
| | Tensile strength | MPa | 21 | 21 | 11 | 27.4 | 27.6 |
| | Flexural strength | MPa | 36 | 38 | | | |

TABLE 2

| | | UNIT | EXAMPLE 6 (comparative) | EXAMPLE 7 (comparative) | EXAMPLE 8 | EXAMPLE 9 | EXAMPLE 10 |
|---|---|---|---|---|---|---|---|
| Structure of the polymer compositions | Polybutadiene content | weight % | 8.1 | 8.3 | 8.3 | 8.2 | 6.1 |
| | HV/LV | weight % | 100/0 | 0/100 | 10/90 | 70/30 | 50/50 |
| | mean particle size | µm | 2.2 | 0.45 | 0.75 | 1.9 | 1.2 |
| | Mw | g/mol | | | | | |
| | Mn | g/mol | | | | | |
| | Mw/Mn | | | | | | |

TABLE 2-continued

|  |  | UNIT | EXAMPLE 6 (comparative) | EXAMPLE 7 (comparative) | EXAMPLE 8 | EXAMPLE 9 | EXAMPLE 10 |
|---|---|---|---|---|---|---|---|
|  | Residue content | % by weight |  |  |  |  |  |
|  | Swelling index |  |  |  |  |  |  |
| Mechanical properties | Melt index | g/10 min | 4.2 | 3.2 | 3.5 | 3.9 | 3.6 |
|  | 1 kg Vicat point | °C. | 96.5 | 96.8 | 97 | 96.4 | 95 |
|  | notched Izod impact strength | kg cm/cm$^2$ | 8.5 | 6.3 | 7.9 | 10.5 | 7.1 |
|  | Flexural modulus | MPa | 1650 | 2100 | 1990 | 1930 | 2100 |
|  | Tensile strength | MPa | 15 | 24 | 20 | 22 | 28.5 |
|  | Flexural strength | MPa |  |  |  |  |  |

We claim:

1. Polymer composition comprising a vinylaromatic polymer and a rubber containing polybutadiene, wherein the rubber is derived from a high-viscosity polybutadiene and from a low-viscosity polybutadiene, the said high-viscosity polybutadiene exhibiting a linear structure, a cis-1,4 structure content higher than 80% and a viscosity, measured at 25° C. at a concentration of 5% by weight in styrene, ranging from 120 to 350 centipoises, and the said low-viscosity polybutadiene exhibiting a cis-1,4 structure content lower than 80% and a viscosity, measured at 25° C. at a concentration of 5% by weight in styrene, ranging from 30 to 90 centipoises.

2. Composition according to claim 1, wherein the high-viscosity polybutadiene exhibits a viscosity, measured at 25° C. at a concentration of 5% by weight in styrene, of between 180 and 300 centipoises.

3. Composition according to claim 1, wherein the low-viscosity polybutadiene exhibits a viscosity, measured at 25° C. at a concentration of 5% by weight in styrene, of between 40 and 75 centipoises.

4. Composition according to claim 1, wherein the high-viscosity polybutadiene exhibits a cis-1,4 structure content higher than 90%.

5. Composition according to claim 1, wherein the low-viscosity polybutadiene exhibits a cis-1,4 structure content ranging from 30 to 60%.

6. Composition according to claim 1, wherein the high viscosity polybutadiene exhibits a 1,2-vinyl structure content.

7. Composition according to claim 1, wherein the low-viscosity polybutadiene exhibits a 1,2-vinyl structure content.

8. Composition according to claim 1, wherein the high-viscosity polybutadiene represents 10 to 90% by weight of the total polybutadiene introduced and in that the low-viscosity polybutadiene represents 90 to 10% by weight of the total polybutadiene introduced.

9. Composition according to claim 8, wherein the high-viscosity polybutadiene represents 10 to 70% by weight of total polybutadiene introduced and in that the low-density polybutadiene represents 90 to 30% by weight of the total polybutadiene introduced.

10. Composition according to claim 1, wherein it contains 2 to 25% by weight of polybutadiene.

11. Composition according to claim 1, wherein the vinylaromatic polymer is polystyrene.

12. Composition according to claim 1, wherein it contains at least one plasticizer.

13. Composition according to claims 1, to 12, wherein it contains at least one antioxidant.

14. Process for the manufacture of a polymer composition comprising a vinylaromatic polymer and a rubber, comprising a stage of polymerization of at least one vinylaromatic monomer in the presence of a high-viscosity polybutadiene and of a low-viscosity polybutadiene and optionally of an organic solvent, wherein the high-viscosity polybutadiene exhibits a linear structure, a cis-1,4 structure content higher than 80% and a viscosity, measured at 25° C. at a concentration of 5% in styrene, ranging from 120 to 350 centipoises, and the low-viscosity polybutadiene exhibits a cis-1,4 structure content lower than 80% and a viscosity, measured at 25° C. at a concentration of 5% by weight in styrene, ranging from 30 to 90 centipoises.

15. Process according to claim 14, wherein the high-viscosity polybutadiene exhibits a viscosity, measured at 25° C. at a concentration of 5% by weight in styrene, of between 180 and 300 centipoises.

16. Process according to claim 14, wherein the low-viscosity polybutadiene exhibits a viscosity, measured at 25° C. at a concentration of 5% by weight in styrene, of between 40 and 75 centipoises.

17. Process according to claim 14, wherein the high-viscosity polybutadiene exhibits a cis-1,4 structure content higher than 90%.

18. Process according to claim 14, wherein the low-viscosity polybutadiene exhibits a cis-1,4 structure content ranging from 30 to 60%.

19. Process according to claim 14, wherein the high-viscosity polybutadiene represents 10 to 90% by weight of the total polybutadiene introduced and in that the low-viscosity polybutadiene represents 90 to 10% by weight of the total polybutadiene introduced.

20. Process according to claim 19, wherein the high-viscosity polybutadiene represents 10 to 70% by weight of the total polybutadiene introduced and in that the low-density polybutadiene represents 90 to 30% by weight of the total polybutadiene introduced.

21. Process according to claim 14, wherein the polymerization stage is carried out in bulk.

22. Process according to claim 14, wherein at least one vinylaromatic monomer is styrene.

23. Process according to claim 14, characterized in that the polymerization stage is carried out in the presence of at least one adjuvant selected from the group consisting of plasticizers and antioxidants.

24. The composition according to claim 6 wherein the high viscosity polybutadiene exhibits a 1,2-vinyl structure content ranging from 0.1 to 5%.

25. The composition according to claim 6 wherein the high viscosity polybutadiene exhibits a 1,2-vinyl structure content ranging from 0.5 to 3%.

26. The composition according to claim 7, characterized in that the low-viscosity polybutadiene exhibits a 1,2-vinyl structure content from 1 to 25%.

27. The composition according to claim 7, characterized in that the low-viscosity polybutadiene exhibits a 1,2-vinyl structure content from 5 to 18%.

* * * * *